United States Patent [19]

Anderson

[11] 4,392,743
[45] Jul. 12, 1983

[54] DISC FILM ADVANCE ASSEMBLY

[75] Inventor: Richard D. Anderson, Maple Grove, Minn.

[73] Assignee: Pako Corporation, Minneapolis, Minn.

[21] Appl. No.: 349,926

[22] Filed: Feb. 18, 1982

[51] Int. Cl.³ ............................................. G03B 27/62
[52] U.S. Cl. ..................................... 355/75; 352/102; 353/110; 354/121
[58] Field of Search .................. 354/121, 275; 74/112; 355/75, 76, 64; 353/103, 110, 107, 25; 352/102, 103

[56] References Cited

U.S. PATENT DOCUMENTS

| 3,873,194 | 3/1975 | Schwartz | 353/110 |
| 4,132,469 | 1/1979 | Harvey | 353/25 |
| 4,194,822 | 3/1980 | Sethi | 354/121 |
| 4,203,733 | 5/1980 | Clifton et al. | 355/64 |
| 4,204,733 | 5/1980 | Modney et al. | 355/64 |
| 4,208,116 | 6/1980 | Morse | 354/275 |
| 4,208,117 | 6/1980 | Harvey et al. | 354/275 |
| 4,212,673 | 7/1980 | Sethi et al. | 430/496 |
| 4,255,034 | 3/1981 | Harvey et al. | 354/121 |
| 4,264,169 | 4/1981 | Harvey | 354/121 |
| 4,268,145 | 5/1981 | Harvey et al. | 354/121 |

OTHER PUBLICATIONS

Research Disclosure, Aug. 1978, Nos. 17287, 17289, 1978 Industrial Opportunities Ltd., Homewell, Havant, Hampshire, United Kingdom.

Primary Examiner—Richard A. Wintercorn
Attorney, Agent, or Firm—Kinney, Lange, Braddock, Westman and Fairbairn

[57] ABSTRACT

A ratchet assembly properly positions selected film frames at a film gate aperture of a photographic printer. The ratchet assembly includes a ratchet wheel rotatably attached to a base having a plurality of ratchet teeth. Each tooth has a rotation-prevention edge and a ramped edge with the ramped edge being inclined toward the rotation-prevention edge of an adjacent tooth. A positioning pawl is pivotally attached to the base proximate a first end and has a head portion proximate a second end. The head portion has a first edge adapted to slidably engage the ramped edge of the ratchet wheel. The head portion of the positioning pawl is biased against the ratchet wheel such that if the ratchet wheel is indexed too far and does not properly position the selected film frame at the print gate aperture, the head portion forces the ratchet wheel to move back by slidably engaging the ramped surface of the ratchet wheel until an alignment pawl engages a notch located on the periphery of the disc film unit. The notch is in a precisely defined spatial relationship to the selected film frame at the print gate aperture and the alignment pawl ensures that the selected film frame is optically centered.

29 Claims, 4 Drawing Figures

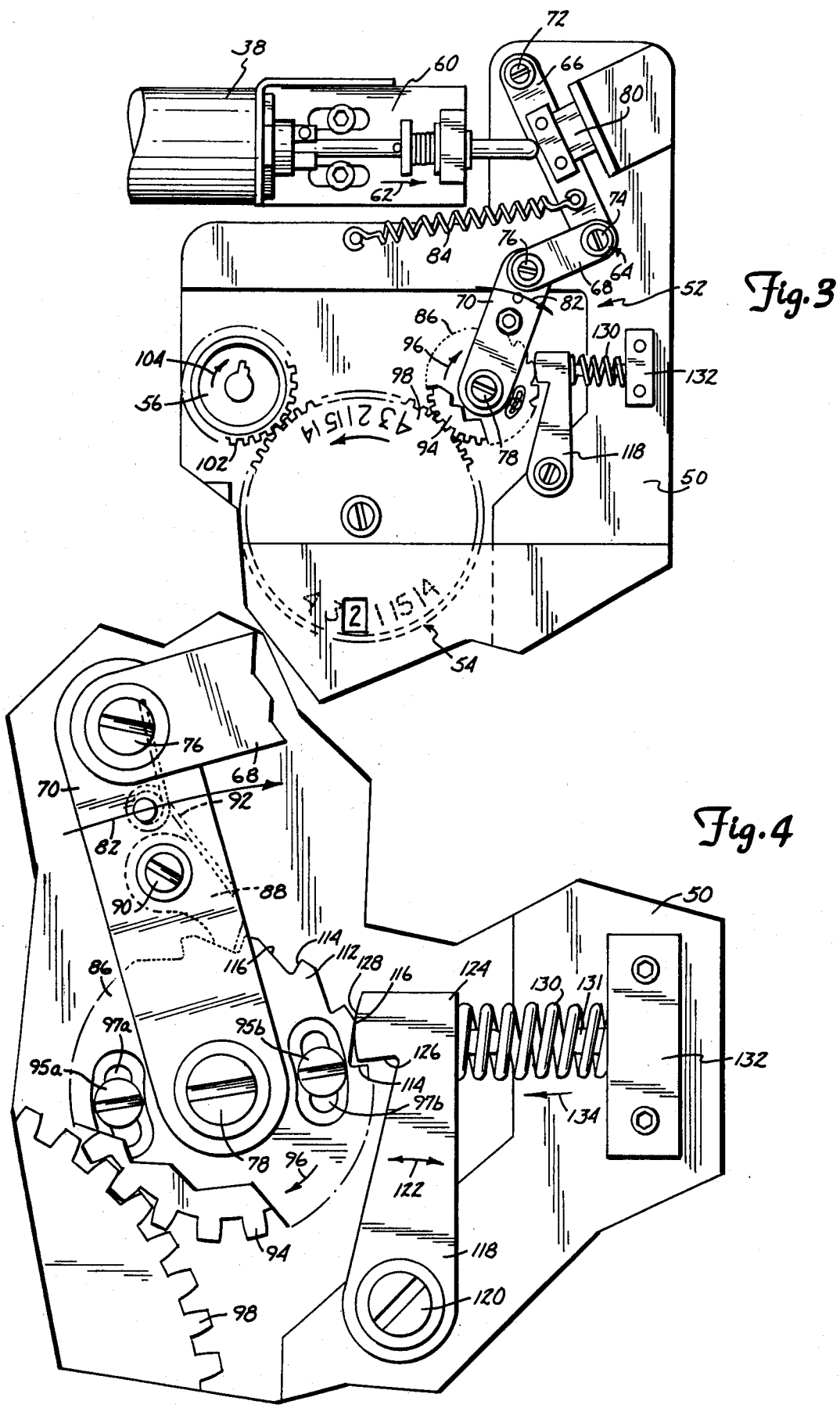

DISC FILM ADVANCE ASSEMBLY

REFERENCE TO CO-PENDING APPLICATIONS

Reference is hereby made to the following co-pending patent applications filed on even date herewith and assigned to the same assignee: "Disc Film Frame Position Indicator"; "Disc Film Holder for Photographic Printer"; "Neghold Assembly"; and "Photographic Film Cleaner".

BACKGROUND OF THE INVENTION

1. Field of the Invention

The present invention relates to ratchet assemblies for positioning disc-like film units in a photographic printer.

2. Description of the Prior Art

Apparatus for holding and indexing conventional strip film on a photographic printer so that selected image frames are positioned at a print gate for transfer of the image to photographic print paper are well known in the art. However, this type of apparatus is wholly unsuited for positioning selected image frames of a disc-like film unit at a print gate wherein the individual image frames are located circumferentially about a central hub. Examples of a disc film unit are disclosed in the following U.S. patents:

| Inventor | U.S. Pat. No. |
| --- | --- |
| Sethi | 4,194,822 |
| Morse | 4,208,116 |
| Harvey et al | 4,208,117 |
| Sethi et al | 4,212,673 |
| Harvey et al | 4,255,034 |
| Harvey | 4,264,169 |
| Harvey et al | 4,268,145 |

A print gate indexing device for a disc-like film unit is disclosed in Research Disclosure of August, 1978, Disclosure No. 17287. Using the print gate indexing device, each image frame is manually advanced into the print gate. The disc-like film unit is held in a single horizontal plane while selected image frames are rotationally indexed to the print gate. However, the manner of indexing individual film frames is unsuitable for semi-automatic or automatic photographic printers.

A rotational positioning device is also disclosed in Research Disclosure of August, 1978, Disclosure No. 17289. The rotational positioning device includes an assembly from which a central shaft extends upwardly for coaxially centering the disc-like film unit on the assembly. A pair of pins also extend upward from the assembly for extending through cooperating apertures in the hub of the disc film unit. No apparatus for indexing the individual film frames is shown.

The Clifton et al U.S. Pat. No. 4,203,664 illustrates a ratchet assembly used to position a disc film unit. A pneumatically operated drive pawl is provided for driving a ratchet gear. However, such a ratchet assembly does not ensure optical centering of each individual film unit indexed to the print gate aperture since the problem of individual film frame being indexed with the ratchet assembly past the optical center is present.

The Modney et al U.S. Pat. No. 4,202,733 shows a wheel beneath the disc film unit holder having a plurality of notches corresponding to the number of frames in a disc film unit. A pair of diametrically opposed blocks containing ball plungers engage an opposed pair of diametrically opposed notches in the wheel when the balls and notches are aligned. The wheel is allowed to rotate, thereby indexing individual film frames, when the balls are withdrawn from the notches, the wheel rotates freely. The apparatus disclosed in the Modney et al patent is, however, rather complicated and does not ensure automatic optical centering of each individual film frame upon indexing.

SUMMARY OF THE INVENTION

The present invention includes an apparatus that indexes selected photographic film frames of a disc-like film unit to a print gate aperture of a photographic printer and ensures optical centering of each individual film frame that is indexed. The apparatus includes a ratchet wheel rotatably attached to a base having a plurality of ratchet teeth. Each tooth has a rotation-prevention edge and a ramped edge with the ramped edge being inclined toward the rotation-prevention edge of an adjacent tooth. A positioning pawl is pivotally attached to the base proximate a first end and has a head portion proximate a second end. The head portion has a first edge adapted to slidably engage the ramped edge of the ratchet wheel. The head portion of the positioning pawl is biased against the ratchet wheel such that if the ratchet wheel is rotationally indexed such that the selected film frame is indexed past the optical center, the positioning pawl forces the ratchet wheel to move in a second angular direction opposite the first angular direction to generally allow the selected film frame to the print gate aperture. An alignment pawl then engages a notch in the disc film unit such that the selected film frame is precisely aligned at the print gate aperture.

BRIEF DESCRIPTION OF THE DRAWINGS

FIG. 3 is a fragmentary top plan view of the ratchet assembly of the present invention;

FIG. 4 is an enlarged fragmentary top plan view of the ratchet assembly of the present invention.

DETAILED DESCRIPTION OF THE PREFERRED EMBODIMENTS

Figure 1:
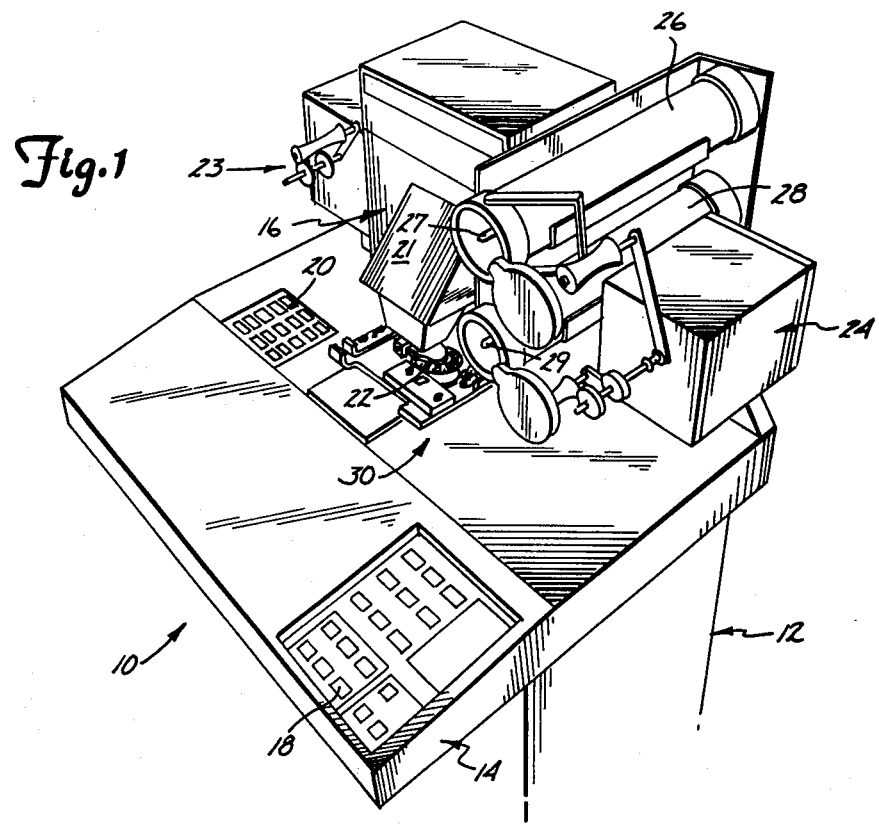
FIG. 1 is a perspective view of a photographic printer with a ratchet assembly of the present invention.

Photographic printers in general are well known, a typical printer, generally indicated at 10, is illustrated in FIG. 1. The printer 10 is more fully described in the Harvey U.S. Pat. No. 4,235,551 and the Baert U.S. Pat. No. 4,175,852, both patents being assigned to the same assignee as the present application. Briefly, the printer includes a light-tight cabinet 12 which houses most of the printer mechanism, a console 14 which is mounted on top of the cabinet 12, and a lamp house 16 mounted on the console 14. The console 14 includes a pair of panels, control panel 18 and keyboard 20, which contain various switches and keys to control and initiate various functions of the printer operation.

Lamphouse 16 contains print lamps (not shown) which provides high intensity light. The light is directed downwardly by means of a drop cone assembly 21 in an essentially uniform light distribution. The light passes through a frame of a disc-like photographic film unit 22 which is clamped at a print gate aperture and passes downwardly into a cabinet 12. The light is imaged by optics contained within the cabinet 12 onto a selected portion of a web of photosensitive print paper (not shown) within the cabinet 12.

The printer 10, briefly described above, has been used in the past exclusively for transferring images from strip-type film, as indicated by a film supply assembly 23 and a film take up assembly 24. Rolls of the strip-type film are placed on the film supply and run along the top of the console 14 and onto the film takeup assembly 24. However, this type of arrangement is wholly unsuitable for printing images from disc-like film units having a plurality of image frames positioned in a generally circular arrangement (the disc-like film units are described subsequently).

To accommodate the disc-like film units in the above-mentioned printer, and other similar printers, the apparatus of the present invention has been provided. Included on the printer are at least two tube-like members 26, 28. A first tube-like member 26 includes a plurality of disc film units mounted on a spindle 27 which have been developed by a suitable photographic developing process awaiting transfer of their images onto print paper. A second tube-like member 28 contains disc film units mounted on a spindle 29 whose images have been transferred to and printed on print paper. A disc film unit is taken from the first tube-like member 26 and placed on the printer whereupon selected images are exposed on the photosensitive print paper (not shown). After all the selected images are printed on the print paper (not shown), the disc film unit is then placed in the second tube-like member 28 for return to the customer along with the corresponding photographic prints.

Figure 2:
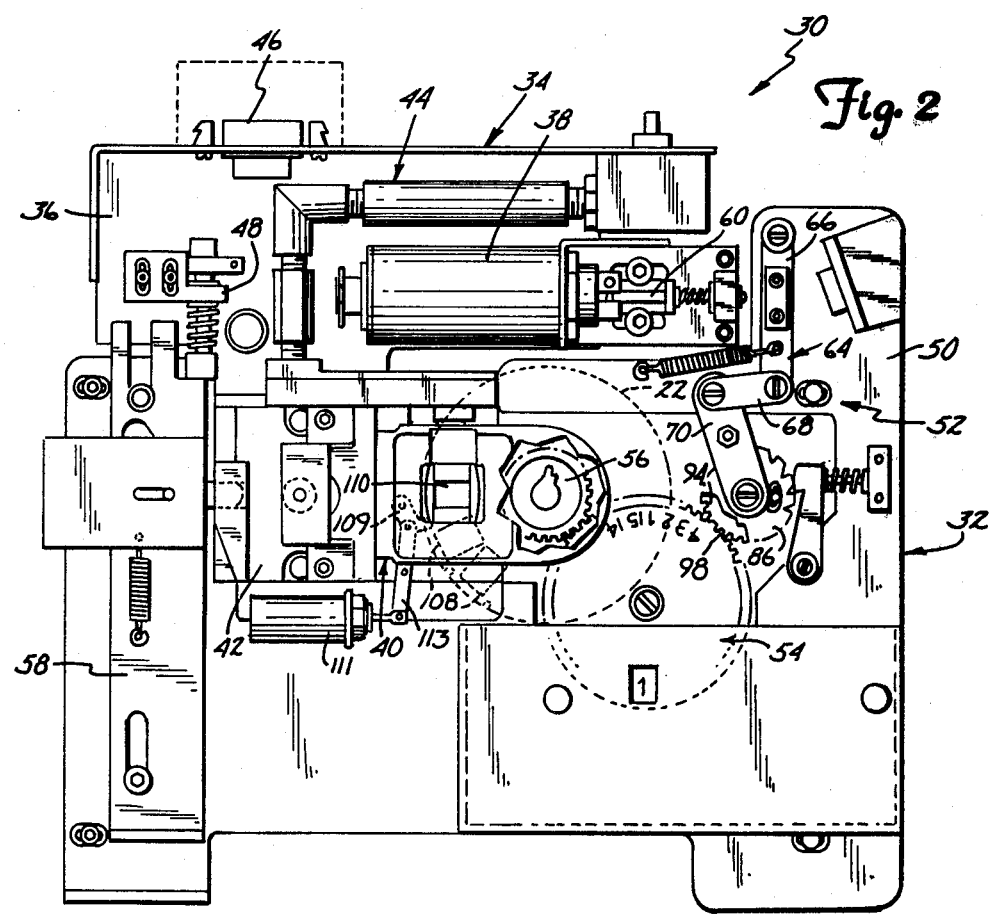
FIG. 2 is a top plan view of a film gate assembly and film advance assembly having the ratchet assembly of the present invention.

The disc-like film units are held in position with respect to the optical center of the printer, and individual image frames are indexed into position under the drop cone 21 by a neghold assembly 30, as more fully illustrated in FIG. 2. The neghold assembly 30 includes a movable film transport assembly 32 and a stationary film gate assembly 34. The film transport assembly 32 is movable in a generally horizontal plane along a pair of horizontal rails (not shown) from a position under the drop cone 21, as shown in FIG. 1 to a position closer to the front of console 14. This allows the operator to remove a film disc unit 22 from transport assembly 32 after printing, to place the completed disc on the spindle 29 within the takeup tube 28, to remove the next disc film 22 from the spindle 27 of the supply tube 26, and to place the next disc film 22 on the transport assembly 32. The transport assembly 32 is then pushed back into its normal operating position with the film disc 22 positioned with one frame below drop cone 21. FIG. 2 shows the neghold assembly 30 with the film transport assembly 32 in its fully inserted position under the drop cone 21, as shown in FIG. 1.

The film gate assembly 34 includes a film gate assembly main base 36 mounted on the paper deck 14 such that the film gate assembly 34 is optically centered to the photographic printer 10. The film gate assembly 34 includes a film advance solenoid 38, an aperture assembly 40 mounted on an adjustable base 42, an air cleaning assembly 44 for directing air onto the film to clean the film, an electrical connector 46 for electrically connecting the film gate assembly 34 to the photographic printer, and a transport base sensor mechanism 48 that provides an electrical signal which indicates when the film transport assembly 32 is in position.

The film transport assembly 32 includes a slidable base 50 that is slidably attached by the rails to the console 14 and the film gate assembly 34. Attaching the film transport assembly 32 to the film gate assembly 34 and the console 14, optically aligns the film transport assembly 32 with the photographic printer 10. The film transport assembly 32 includes a film advance mechanism 52, a disc film frame position indicator 54, a disc film holder 56, and a latching assembly 58.

The film advance solenoid 38 has a plunger 60 which moves in a general direction of arrow 62 when a solenoid is energized, as best illustrated in FIG. 3. The plunger 60 engages pivotal linkage 64 of the film advance mechanism 52. The pivotal linkage 64 includes a first pivot arm 66, a second pivot arm 68, and a third pivot arm 70. The first pivot arm 66 is pivotally connected to the base 50 at a first fixed pivot pin 72. The pivot arm 66 is pivotally connected to the second pivot arm 68 by a first floating pivot 74 and the pivot arm 68 in turn is connected to the third pivot arm 70 by a second floating pivot 76. The third pivot arm 70 is pivotally connected to the base 50 at a second fixed pivot pin 78. The pivot pins 72, 74, 76 and 78 preferably are of a suitable ball bearing construction for long-term reliable operation of the linkage 64.

The first pivot arm 66 has a striker block 80 mounted thereon which the plunger 60 of the solenoid 38 engages when the solenoid is energized. As is easily seen from FIG. 3, when the plunger 60 moves in the direction of arrow 62 and strikes the striker block 80, the linear movement of the plunger 60 is converted by the linkage 64 to an angular movement generally indicated by arrow 82. A coil spring 84 fixedly attached to the base 50 at one end and to the first pivot arm below the striker block 80 at another end biases the linkage 64 against the solenoid plunger 60 and returns the linkage in a direction opposite arrow 62 to a position prior to energization of the solenoid 38.

Angular movement, as indicated by arrow 82, is transmitted to a ratchet wheel 86 by the linkage 64. The ratchet wheel 86 is rotatably mounted to the base 50 coaxially with the second fixed pivot pin 78. The angular movement from the pivotal linkage 64 is transmitted to the ratchet wheel 86 by a ratchet wheel advancing pawl 88. The ratchet wheel advancing pawl 88 is pivotally attached to the underside of the third pivot arm 70 by a pivot pin 90 and is biased against the ratchet wheel 86 by a spring 92. As will be understood by those skilled in the art, other types of advancing pawls which advance a ratchet wheel are includable within the present invention.

A ratchet gear 94 is coaxially and rotatably attached with respect to the second fixed pivot pin 78 and fixedly attached to the ratchet gear 86 for rotation therewith. When the ratchet wheel 86 is rotated by the advancing pawl 88, the ratchet gear 94 also rotates substantially the same angular distance as the ratchet gear 86 in a general clockwise direction of arrow 96.

The ratchet gear 94 and the ratchet wheel 86 are attached to each other by screws 95a and 95b which extend through slots 97a and 97b in the ratchet wheel 86. The slots 97a and 97b are positioned on diametrically opposing sides of the fixed pivot pin 78. The screws 95a and 95b are threaded into cooperating threaded apertures (not shown) in the ratchet gear 94. The screws 95a and 95b when in a tightened position hold the ratchet gear 94 and the ratchet wheel 86 in a fixed angular relationship such that both the ratchet gear 94 and the ratchet wheel 86 rotate together.

The screws 95a and 95b also permit angular adjustment of the ratchet wheel with respect to the ratchet gear. When the screws 95a and 95b are untightened, the ratchet wheel 86 is adjustable in an angular direction by moving the ratchet wheel along the slots 97a and 97b with respect to the screws 95a and 95b. The screws 95a and 95b are then retightened to fixedly attach the ratchet gear 94 and the ratchet wheel 86 to each other. The angular adjustment of the ratchet wheel 86 is important in initial field installation of the film transport assembly.

A film frame position indicator gear 98 of the film frame position indicator 54 cooperates with the ratchet gear 94, as best illustrated in FIG. 3. The ratchet gear 94 advances the frame position indicator gear 102 in a general counterclockwise direction of arrow 106. The film frame position indicator is described in further detail in the previously-mentioned co-pending patent application, "Disc Film Frame Position Indicator", and that description is hereby incorporated by reference.

A disc film holder gear 102 in turn cooperates with the frame position indicator gear 98 to turn the gear 102 in a generally clockwise direction of arrow 104 thereby indexing the disc film holder 56. As best illustrated in FIG. 2, the disc film unit 22 having a plurality of individual film frames 108 positioned in a circumferential manner is positioned on the disc film holder 56. The disc 22 has a plurality of notches at circumferentially spaced positions about its edge. Each of these notches has a predetermined spatial relationship to the position of an adjacent film frame on the disc 22. The disc film holder 56 is described in further detail in the previously-mentioned co-pending patent application, "Disc Film Holder for Photographic Printer", and that description is hereby incorporated by reference. Examples of the disc-like film unit 22 are disclosed in the patents which were listed in the Description of the Prior Art and which are herein incorporated by reference.

The individual film frames 108 must be optically centered with respect to a film gate aperture 110 of the aperture assembly 40 for proper transfer of the image to photographic print paper. Consequently, when a selected individual film frame 108 is indexed by the film holder 56 through the film advance assembly 52, as described previously, it is important that the film advance assembly 52 does not cause an individual film frame 108 to travel past the optical center of the print gate aperture 110. If the film frame 108 travels past the optical center, the individual film frame 108 must then return to the optical center of the print gate aperture 110, causing expensive delays in printing of the photographic print, or must be cropped, reducing the image that is transferred from the frame 108 to the print paper.

Precise alignment of the respective film frames 108 on the film disc 22 with the print gate aperture 110 is provided by alignment pawl 109, which engages the notch in the edge of film disc 22 which has a precisely defined spatial relationship to the position of the image area located at the print gate. In the embodiment shown in FIG. 2, position of the pawl 109 is controlled by solenoid 111 through a pivot arm 113, which is connected to the pawl 111. The solenoid 111 is actuated to withdraw the pawl 111 from engagement with the notch in the edge of disc 22 to allow indexing of the disc 22 to bring the next film frame 108 into alignment with the print gate aperture. Travel past the optical center of the print gate aperture is also eliminated by the present invention. As illustrated in FIG. 4, the ratchet wheel 86 has a plurality of ratchet teeth 112, each tooth having a preferred profile. Each tooth 112 has a rotation-prevention edge 114 and a ramped edge 116. The ramped edge 116 is inclined towards the rotation-prevention edge 114.

A positioning pawl 118 is pivotally attached to the base 50 by a pivot pin 120 permitting pivoting in a general direction of arrow 122. The positioning pawl 118 has a head portion 124 having a first edge 126 that engages the rotation-prevention edge 114. The head portion also has a second, preferably, curved surface 128 which slidably engages the ramped edge 116. The ramped edge 116 is inclined such that the curved surface slides on the ramped edge 116.

The head portion 124 of the pawl is biased against the ramped edge 116 preferably by a coil spring 130. The coil spring 130 is held in position by engaging at one end a support block and surrounding a pin 131. The support block is fixedly attached to the base 50, such as by screws, with the spring 130 providing a biasing force in the general direction of arrow 134 to the head portion of the positioning pawl 118.

If the ratchet wheel is indexed such that the film frame 108 is positioned past the optical center of the print gate aperture, the inclined surface of the ramped edge 116 will slide along the curved surface of the edge 128 in a direction generally opposite to arrow 96 moving the ratchet wheel and bring the edges 114 and 126 closer to each other until there is only a slight space between the edges 114 and 126. The backward rotation of the ratchet wheel indexes the selected film frame in general alignment at the print gate aperture such that the notch adjacent the film frame 108 is positioned to be engaged by the alignment pawl 109. The alignment pawl 109 then holds the film frame 109 in precise alignment at the print gate aperture.

The design of the edges 116 and 128 is adaptable to a wide range of number of ratchet teeth per ratchet wheel. In one working embodiment, fifteen ratchet teeth were used which corresponds to the number of film frames on a typical disc-like film unit. However, the number of teeth, using the same diameter of ratchet wheel, could be increased to sixteen or decreased to twelve without changing the incline of the ramped edge or the configuration of the curvature of the edge 128. Furthermore, to accommodate more or less teeth, the diameter of the ratchet wheel can be changed with the corresponding change in the curvature of the edge 128 to accommodate disc film units having a different number of film frames.

CONCLUSION

The film advance assembly of the present invention optically centers each individual film frame of a disc-like film unit, eliminating the problem of a film frame traveling past the optical center of the film gate aperture of a photographic printer. In addition, the film advance assembly is adjustable during initial field installation of the film transport assembly.

Although the present invention has been described with reference to preferred embodiments, workers skilled in the art will recognize that changes may be made in form and detail without departing from the spirit and scope of the invention.

What is claimed is:

1. A film advance assembly for use in a photographic printer for advancing a selected film frame of a disc-like film unit on a disc film holder to a print position defined by an optical center at a print gate aperture, the film advance assembly comprising:

a base;

a ratchet wheel rotatably attached to the base and having a plurality of ratchet teeth;

gear train means rotatably attached to the base for rotatably connecting the ratchet wheel with the disc film holder;

means for rotationally indexing the ratchet wheel in a first angular direction to bring the selected film frame to the print position at the print gate aperture; and means for engaging the ratchet wheel forcing the ratchet wheel to move in a second angular direction when the film frame has been rotationally indexed past the print position.

2. The assembly of claim 1 wherein each tooth of the ratchet wheel has a rotation-prevention edge and a ramped edge, the ramped edge being inclined toward the rotation-prevention edge of an adjacent tooth and wherein the means for engaging the ratchet wheel includes:

a positioning pawl having a first and second end and pivotally attached to the base proximate the first end and having a head portion proximate the second end, the head portion having a first edge positioned to engage the ramped edge; and first biasing means for biasing the head portion of the positioning pawl against the ratchet wheel such that the ratchet wheel is rotated in a second angular direction opposite to the first angular direction to bring the selected film frame in general alignment with the print gate aperture.

3. The assembly of claim 2 and further including:

means for providing a motive force to index the ratchet wheel; and linkage means for transferring the motive force to the means for rotationally indexing the ratchet.

4. The assembly of claim 3 wherein the linkage means includes:

a first link having a first and second end and pivotally attached to the base proximate the first end;

a second link having a first and second end and pivotally attached to the second end of the first link proximate a first end;

a third link having a first and second end and pivotally attached to the second end of the second link proximate a first end and pivotally attached to the base at the second end coaxially with the ratchet wheel; and wherein the means for providing motive force engages the first link and pivots the first link about the base and pivots the first, second and third links with respect to each other thereby transferring the motive force to the ratchet wheel through the means for rotationally indexing.

5. The assembly of claim 4 wherein the means for rotationally indexing includes an advancing pawl pivotally attached to the third link at a first end and engaging the ratchet wheel at a second end, and a second biasing means for biasing the advancing pawl against the ratchet wheel such that the pawl indexes the ratchet wheel through pivotal movement of the first, second and third links.

6. The assembly of claim 4 wherein the means for providing a motive force is an electrically operated solenoid having a plunger.

7. The assembly of claim 6 and further including a striker block fixedly attached to the first link and adapted for engagement with the solenoid plunger.

8. The assembly of claim 4 and further including second biasing means for biasing the first link in a direction opposite to the motive force.

9. The assembly of claim 2 wherein the second edge of the head portion of the positioning pawl is a curved edge.

10. The assembly of claim 2 wherein the first biasing means is a coil spring.

11. The assembly of claim 1 wherein the gear means includes a ratchet gear coaxially mounted with the ratchet wheel and fixedly attached to the ratchet wheel for simultaneous rotation therewith, and further comprising means for adjusting the relative angular position of the ratchet wheel with respect to the ratchet gear.

12. The assembly of claim 11 wherein the means for adjusting the relative angular position of the ratchet wheel is a pair of threaded fasteners extending through a pair of slots in the ratchet wheel and threadably engaging the ratchet gear such that when the threaded fasteners are untightened the ratchet wheel is movable in an angular direction with respect to the ratchet gear.

13. A film advance assembly for advancing a selected film frame of a disc-like film unit into alignment with a print gate, the assembly comprising:

a base;

a rotatable holder rotatably mounted to the base;

means for indexing the rotatable holder in a first angular direction during an indexing cycle to bring the selected film frame into general alignment with the print gate;

means for rotating the rotatable holder in a second reverse angular direction at the end of the indexing cycle; and means for stopping reverse motion of the rotatable holder when the selected film frame is in alignment with the print gate.

14. The assembly of claim 13 wherein the disc-like film unit includes a notch at an edge, the notch being located a predetermined distance with respect to the selected film frame and wherein the means for stopping reverse motion includes a pawl and means for actuating the pawl to engage the notch corresponding to the selected film frame.

15. The assembly of claim 14 wherein the means for actuating the pawl includes a pivot arm and a solenoid mounted on the base and pivot means pivotally attaching the pivot arm to the pawl and to the solenoid.

16. The assembly of claim 13 wherein the means for indexing includes:

a ratchet wheel rotatably attached to the base and having a plurality of ratchet teeth;

means for rotationally indexing the ratchet wheel in the first angular direction to a print position at the print gate;

means for engaging the ratchet wheel forcing the ratchet wheel to move in a second opposite angular direction when the ratchet wheel has been rotationally indexed past the print position; and gear train means for rotatably connecting the ratchet wheel with the disc film holder.

17. The assembly of claim 16 wherein each ratchet tooth as a rotation-prevention edge and a ramped edge, the ramped edge being inclined toward the rotation-prevention edge of an adjacent tooth and wherein the means for rotating in a second reverse angular direction includes:

positioning pawl means having a first and second end and pivotally attached to the base proximate the first end and having a head portion proximate the second end, the head portion having a first edge positioned to engage the ramped edge; and first biasing means for biasing the head portion of the positioning pawl against the ratchet wheel such that the ratchet wheel is rotated in the second reverse angular direction.

18. The assembly of claim 17 and further including:

means for providing a motive force to index the ratchet wheel; and linkage means for transferring the motive force to the means for rotationally indexing the ratchet.

19. The assembly of claim 18 wherein the linkage means includes:

a first link having a first and second end and pivotally attached to the base proximate the first end;

a second link having a first and second end and pivotally attached to the second end of the first link proximate a first end;

a third link having a first and second end and pivotally attached to the second end of the second link proximate a first end and pivotally attached to the base at the second end coaxially with the ratchet wheel; and wherein the means for providing motive force engages the first link and pivots the first link about the base and pivots the first, second and third links with respect to each other thereby transferring the motive force to the ratchet wheel through the means for rotationally indexing.

20. The assembly of claim 19 wherein the means for rotationally indexing includes an advancing pawl pivotally attached to the third link at a first end and engaging the ratchet wheel at a second end, and a second biasing means for biasing the advancing pawl against the ratchet wheel such that the pawl indexes the ratchet wheel through pivotal movement of the first, second and third links.

21. The assembly of claim 20 and further including a striker block fixedly attached to the first link and adapted for engagement with the solenoid plunger.

22. The assembly of claim 19 wherein the means for providing a motive force is an electrically operated solenoid having a plunger.

23. The assembly of claim 19 and further including second biasing means for biasing the first link in a direction opposite to the motive force.

24. The assembly of claim 18 wherein the second edge of the head portion of the positioning pawl is a curved edge.

25. The assembly of claim 18 wherein the first biasing means is a coil spring.

26. The assembly of claim 16 wherein the gear train means includes a ratchet gear coaxially mounted with the ratchet wheel and fixedly attached to the ratchet wheel for simultaneous rotation therewith, and further including:

means for adjusting the relative angular position of the ratchet wheel with respect to the ratchet gear.

27. The assembly of claim 26 wherein the means for adjusting the relative angular position of the ratchet wheel is a pair of threaded fasteners extending through a pair of slots in the ratchet wheel and threadably engaging the ratchet gear such that when the threaded fasteners are untightened the ratchet wheel is movable in an angular direction with respect to the ratchet gear.

28. A film advance assembly for advancing a selected film frame of a disc-like film unit to a print position defined by a print gate aperture of a photographic printer, the assembly comprising:

a base;

a ratchet wheel rotatably mounted on the base;

a disc film holder for rotating the disc-like film unit;

a ratchet gear coaxially mounted with the ratchet wheel for rotation therewith and for causing rotation of the disc film holder; and means for adjusting the relative angular position of the ratchet wheel with respect to the ratchet gear.

29. The assembly of claim 28 wherein the means for adjusting the relative angular position of the ratchet wheel is a pair of threaded fasteners extending through a pair of slots in the ratchet wheel and threadably engaging the ratchet gear such that when the threaded fasteners are untightened the ratchet wheel is movable in an angular direction with respect to the ratchet gear.

* * * * *